(12) United States Patent
Biewer et al.

(10) Patent No.: US 11,142,051 B2
(45) Date of Patent: Oct. 12, 2021

(54) SLIDING ROOF SYSTEM FOR A MOTOR VEHICLE

(71) Applicant: Roof Systems Germany GmbH, Dietzenbach (DE)

(72) Inventors: Christian Biewer, Dietzenbach (DE); Heiko Albert, Dietzenbach (DE)

(73) Assignee: ROOF SYSTEMS GERMANY GMBH, Dietzenbach (DE)

( * ) Notice: Subject to any disclaimer, the term of this patent is extended or adjusted under 35 U.S.C. 154(b) by 18 days.

(21) Appl. No.: 16/692,756

(22) Filed: Nov. 22, 2019

(65) Prior Publication Data
US 2020/0164731 A1    May 28, 2020

(30) Foreign Application Priority Data
Nov. 27, 2018 (DE) .................. 10 2018 130 013.1

(51) Int. Cl.
*B60J 7/057* (2006.01)
*B60J 7/043* (2006.01)
*B60J 7/16* (2006.01)

(52) U.S. Cl.
CPC ............. *B60J 7/057* (2013.01); *B60J 7/1642* (2013.01); *B60J 7/043* (2013.01)

(58) Field of Classification Search
CPC . B60J 7/024; B60J 7/043; B60J 7/0435; B60J 7/057; B60J 7/0573
USPC .......... 296/216.02–216.05, 222, 223, 220.01
See application file for complete search history.

(56) References Cited

U.S. PATENT DOCUMENTS

| | | | |
|---|---|---|---|
| 9,227,493 B2* | 1/2016 | Nellen | B60J 7/0435 |
| 10,350,979 B2* | 7/2019 | Biewer | B60J 7/043 |
| 2017/0050502 A1* | 2/2017 | Heidan | B60J 7/024 |

FOREIGN PATENT DOCUMENTS

| | | |
|---|---|---|
| DE | 102015009305 A1 | 1/2017 |
| DE | 102015225811 A1 | 2/2017 |
| DE | 102016220991 A1 | 4/2018 |
| DE | 102016123693 A1 | 6/2018 |
| DE | 102016125923 A1 | 7/2018 |

* cited by examiner

*Primary Examiner* — Dennis H Pedder
(74) *Attorney, Agent, or Firm* — Dilworth IP, LLC

(57) ABSTRACT

A sliding roof system for a motor vehicle comprises a front lifting mechanism and a rear lifting mechanism which are assigned to a front and a rear edge respectively of a cover of the sliding roof system, as well as a connecting element which is arranged between the front and the rear lifting mechanisms. The connecting element is formed as a connecting plate which is displaceable transverse to its direction of extension and in its plane of extension between an actuation position and a catch position.

4 Claims, 8 Drawing Sheets

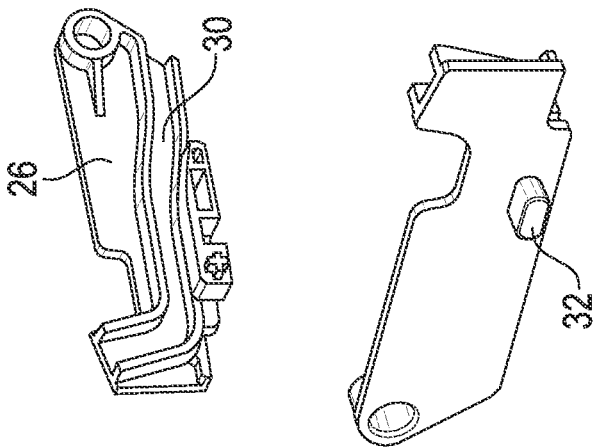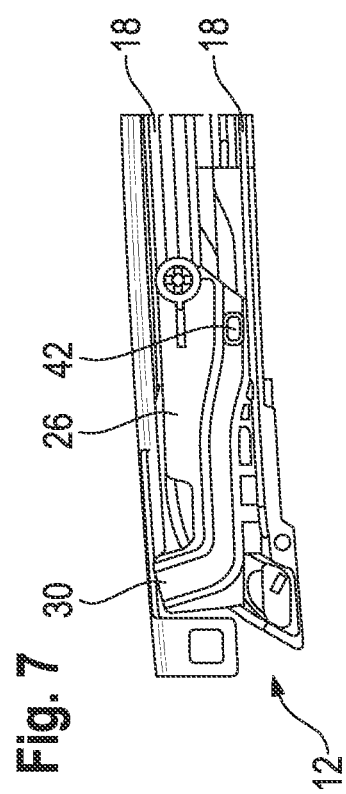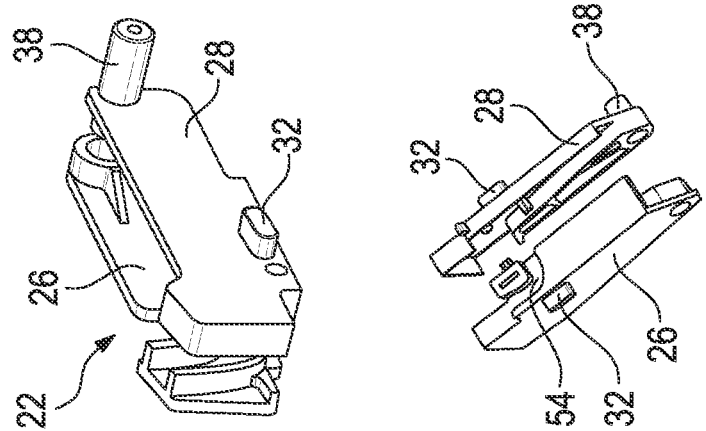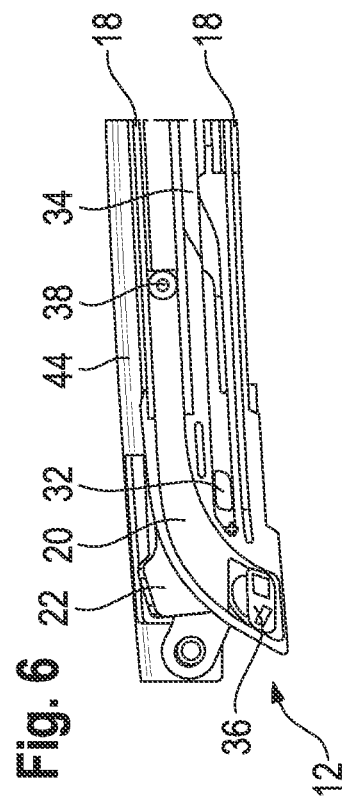

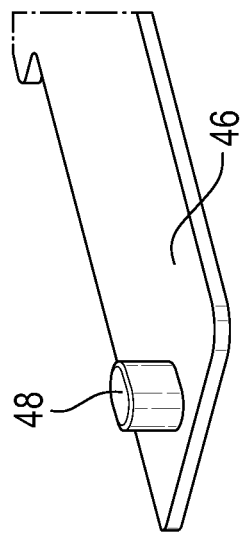
Fig. 12
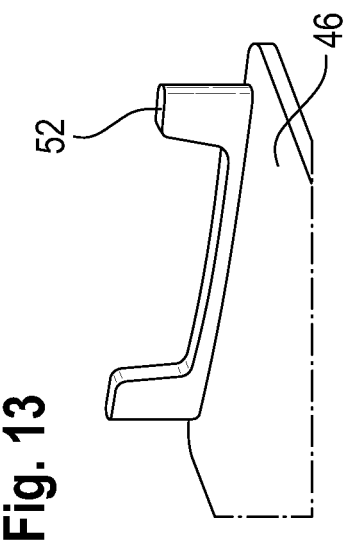
Fig. 13
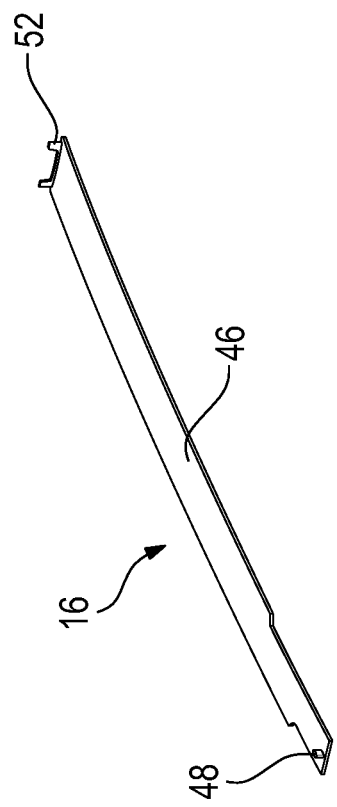
Fig. 11
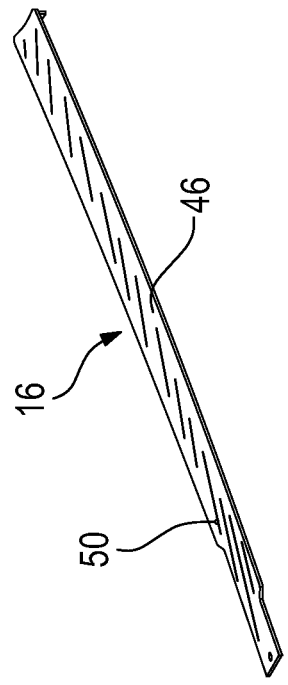

SLIDING ROOF SYSTEM FOR A MOTOR VEHICLE

The invention relates to a sliding roof system for a motor vehicle, with a front lifting mechanism and a rear lifting mechanism which are assigned to a front and a rear edge respectively of a cover of the sliding roof system, as well as a connecting element which is arranged between the front and the rear lifting mechanisms.

BACKGROUND OF THE INVENTION

Sliding roof systems for motor vehicles make it possible to uncover a roof opening to a greater or lesser extent by moving the cover between a closed position and a partially or completely opened position. In many cases they are so-called spoiler sunroofs in which the cover is first lifted and then moved backwards over the roof outer panel adjoining the roof opening or over a further cover.

The distance by which the cover must be lifted outwards is predefined by external factors. The cover must be lifted far enough above the roof outer panel for there being no risk that it (and a cover holder bearing the cover) does not touch the roof outer panel in any operational state. The components required for the lifting are arranged in an area of the motor vehicle in which there is little space available, as they compromise headroom.

The object of the invention is to provide a sliding roof system for a motor vehicle which has a small overall height.

BRIEF DESCRIPTION OF THE INVENTION

The object is achieved according to the invention by a sliding roof system for a motor vehicle, with a front lifting mechanism and a rear lifting mechanism which are assigned to a front and a rear edge respectively of a cover of the sliding roof system, as well as a connecting element which is arranged between the front and the rear lifting mechanisms, characterized in that the connecting element is formed as a connecting plate which is displaceable transverse to its direction of extension and in its plane of extension between an actuation position and a catch position. Because a connecting plate is used, the installation space needed for the sliding roof system can be effectively reduced so that a small overall height can be achieved. At the same time a displaceable arrangement of the connecting plate makes it possible to switch relatively easily between an actuation position in which the connecting plate for example couples the front and rear lifting mechanisms to each other, and a catch position in which the connecting plate can no longer be displaced backwards.

Because the connecting plate has a stop with which it is pivotably coupled to the rear lifting mechanism, a secure connection to the rear lifting mechanism can be guaranteed while at the same time a movement of the connecting plate transverse to its direction of extension can be made possible during the transition from the actuation position to the catch position.

According to an embodiment, the connecting plate can have a catch protrusion on one flat side and an actuation protrusion on the opposite flat side which is assigned to the front lifting mechanism. In this way the sliding roof system can be designed such that the front lifting mechanism which can cooperate with the actuation protrusion, and further components which are actively connected to the catch protrusion, are arranged on different sides of the connecting plate. A particularly compact design of the sliding roof system can thereby be achieved.

Because the actuation protrusion in the actuation position of the connecting plate moveably engages in a connecting slotted guide of the front lifting mechanism, the front lifting mechanism can cooperate with the connecting plate during the opening and closing process of the sliding roof system.

According to a preferred embodiment, the actuation protrusion in the catch position of the connecting plate is not connected to the front lifting mechanism. The sliding roof system can thereby be designed such that the connecting plate can decouple from the front lifting mechanism during the opening process of the sliding roof system.

The catch element can be moveably arranged inside a catch slotted guide of the guide rail and/or a base plate. In this way, depending on the position of the connecting plate, the catch element can control whether the connecting plate is in the actuation position or the catch position.

In a preferred embodiment, the connecting slotted guide and the catch slotted guide can have, at their rear ends, sections running transverse to the plane of extension of the connecting plate, wherein the transversely running section of the catch slotted guide is arranged working in the opposite direction to the transversely running section of the connecting slotted guide. When the catch position is reached, the catch element of the connecting plate can thereby cause a transverse movement of the connecting plate which can displace the actuation element such that it is no longer entrained by the front lifting mechanism during movement thereof.

Because the catch element in the catch position of the connecting plate lies in the transversely running section of the catch slotted guide, the connecting plate can be displaced transversely between an actuation position and a catch position and can thus be decoupled from the front lifting mechanism.

According to a preferred embodiment, the positioning of the connecting plate in the catch position can be secured by a securing element, wherein the securing element is preferably a leaf spring. In this way the connecting plate can effectively be prevented from being displaced in an uncontrolled manner after reaching the catch position, for example due to vibrations or transverse loads.

According to a further preferred embodiment, the front lifting mechanism can have a protrusion which is in contact with the securing element at least in the vent position. In this way an arrangement can be achieved in which the securing element does not pass into a securing position in which the securing element secures the positioning of the connecting plate, until after the catch position of the connecting plate has been reached. At the same time, during the closing process of the sliding roof system, the front lifting mechanism can ensure that the connecting plate is uncovered again.

BRIEF DESCRIPTION OF THE DRAWINGS

Further advantages and aspects of the invention follow from the description below and the drawings, to which reference is made. There are shown in:

FIG. 4, in a perspective view, a slotted guide component subassembly which is used in the front lifting mechanism, in a top view and a bottom view;

FIG. 5 one of the slotted guide components from FIG. 4 in two perspective views;

FIG. 6 a longitudinal section through the front lifting mechanism, wherein the cover is in the closed position;

FIG. 7 a further longitudinal section through the front lifting mechanism, wherein the cover is in the closed position;

FIG. 11 a connecting plate of a sliding roof system according to the invention in a top view and a bottom view;

FIG. 12 a detail view of the front end of the connecting plate from FIG. 11;

FIG. 13 a detail view of the rear end of the connecting plate from FIG. 11;

DETAILED DESCRIPTION OF THE INVENTION

Figure 1:
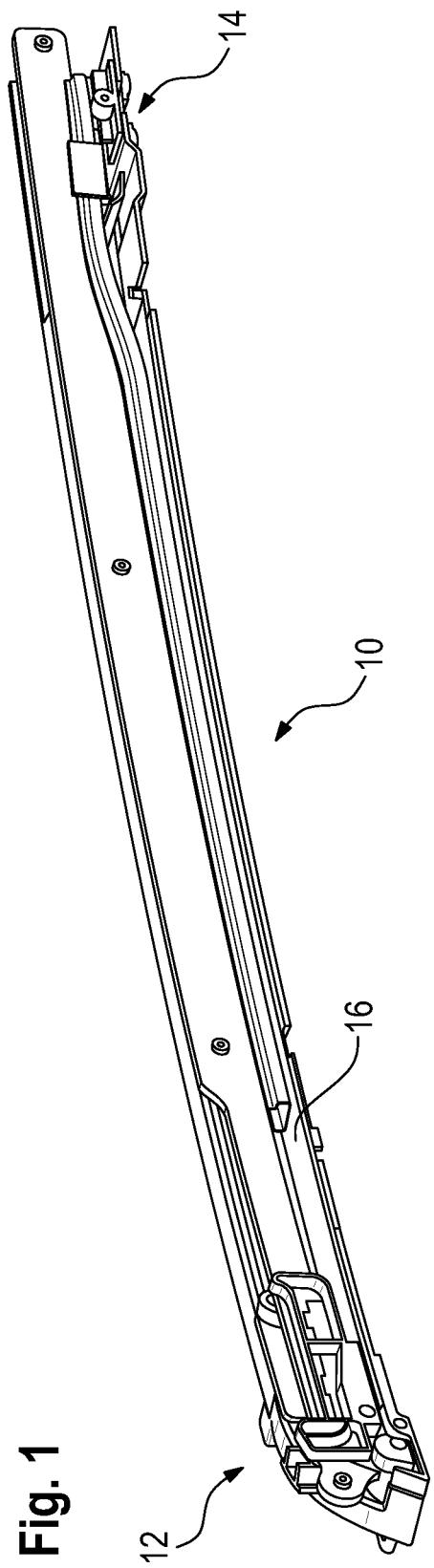
FIG. 1, in a perspective view, a guide rail of a sliding roof system according to the invention.

FIG. 1 shows a displacement mechanism 10 of a sliding roof system according to the invention, which is arranged along an edge, extending in the longitudinal direction, of a roof opening in a roof panel of a motor vehicle. A second displacement mechanism is arranged on the opposite edge of the roof opening. As the two displacement mechanisms are constructed with the components contained therein either symmetrical or mirror-symmetrical to each other, only one displacement mechanism is described below. The explanations also apply to the second displacement mechanism.

Integrated in the displacement mechanism 10 are a front lifting mechanism 12 and a rear lifting mechanism 14 as well as a connecting element 16 which is arranged between the front lifting mechanism 12 and the rear lifting mechanism 14 and couples them to each other.

First of all, only the front lifting mechanism 12 and its functioning are described.

Figure 3:
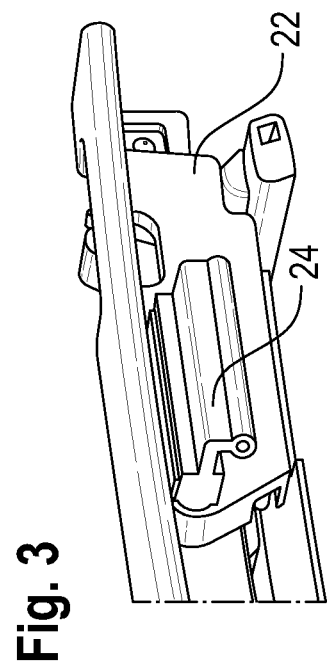
FIG. 3 a further perspective view of the front lifting mechanism, wherein some components are removed in order to be able to see internal components.
Figure 2:
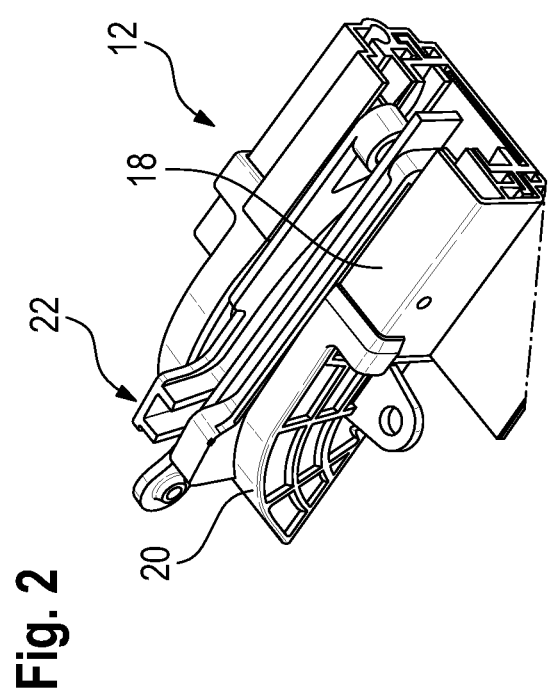
FIG. 2 a perspective view of a front lifting mechanism.

FIG. 2 shows the front lifting mechanism 12 in a position which corresponds to a closed cover 44 of the sliding roof system 10, thus a position in which the roof opening is closed by the cover 44. A guide rail 18 and a lifting slotted guide 20 are to be seen. A slotted guide component 22 is arranged inside the guide rail 18. The slotted guide component 22 is pivotably connected to a controlling carriage 24 which is to be seen in FIG. 3. The controlling carriage 24 is guided inside the guide rail 18, with the result that it can be displaced along the guide rail 18.

The controlling carriage 24 can be connected, for example via a drive cable not shown here, to an electric motor which controls the longitudinal movement of the controlling carriage 24.

The slotted guide component 22 contains two slotted guide component halves 26 and 28, as is to be seen in FIG. 4. At least one of the slotted guide component halves 26 and 28 has a controlling slotted guide 30. As shown in FIG. 5, the controlling slotted guide 30, viewed from front to back, extends diagonally downwards from an upper level and then continues substantially flat, wherein shortly before the end section another slightly sloping section is provided.

In addition, at least one of the slotted guide component halves 26 and 28 comprises, on its side face pointing towards the guide rail, a first slotted guide slider 32 which cooperates with a displacement slotted guide 34 of the guide rail 18.

FIGS. 6 and 7 show the front lifting mechanism 12 in the closed position of the sliding roof system 10 in longitudinal sections. A lifting slider 36 which is assigned to a cover 44 of the sliding roof system 10 (thus is attached either to the cover 44 directly or to a cover support 88), is guided inside the lifting slotted guide 20. The lifting slotted guide 20 (viewed from front to back) extends from a level underneath the guide rail 18 diagonally towards the upper level of the guide rail 18. The cover-side lifting slider 36 in the closed position of the sliding roof system is thereby likewise located at least partially underneath the level of the guide rail 18.

Inside the guide rail 18, in the embodiment shown, there is a second slotted guide slider 38 which on one side connects the slotted guide component 22 to the guide rail 18. The slotted guide slider 38 defines a rotational axis for the slotted guide component 22.

On the opposite side of the guide rail 18, in the embodiment represented, the slotted guide component 22 is guided in the guide rail 18 by means of the controlling carriage 24. At the same time, the slotted guide component 22 is moveably mounted via the first slotted guide slider 32 in the displacement slotted guide 34 which is assigned to the guide rail 18.

A controlling slider 42 assigned to the cover 44 of the sliding roof system 10 is moveably arranged inside the controlling slotted guide 30, with the controlling slider 42 in the closed position of the sliding roof system 10 being located in the rear area of the controlling slotted guide 30 running substantially flat.

If the controlling carriage 24 is now set in motion, for example by means of an electric motor, via the drive cable, the controlling carriage 24 pulls the slotted guide component 22 with it. The first slotted guide slider 32 thereby moves inside the displacement slotted guide 34 of the guide rail 18. The front part of the displacement slotted guide 34 is implemented substantially flat, with the result that the slotted guide component 22 is first moved backwards at approximately the same height.

At the same time, the cover-side controlling slider 42 inside the controlling slotted guide 30 first moves in the part of the controlling slotted guide 30 extending substantially flat. As soon as it runs through the flat rise of the controlling slotted guide 30 following the end section, the controlling slider 42 is lifted slightly. This has the result that the cover-side lifting slider 36 inside the lifting slotted guide 20 is also lifted slightly. This is converted into a slight movement of the lifting slider 36 backwards, because of the diagonal alignment of the lifting slotted guide 20.

Figure 9:
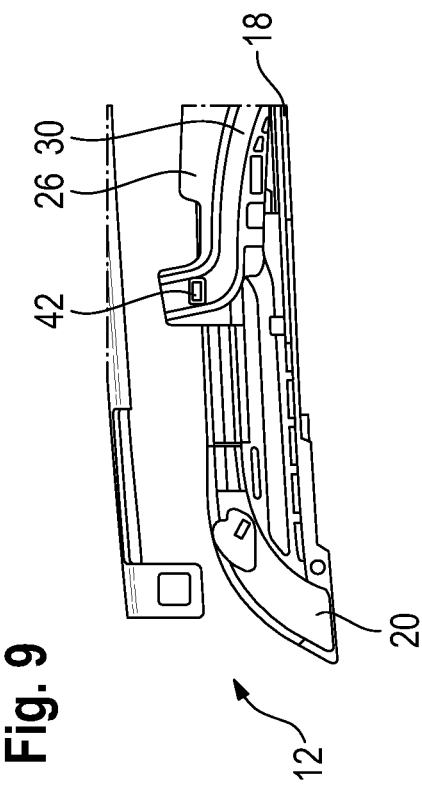
FIG. 9 a view corresponding to that of FIG. 7, wherein the cover is almost completely lifted.
Figure 8:
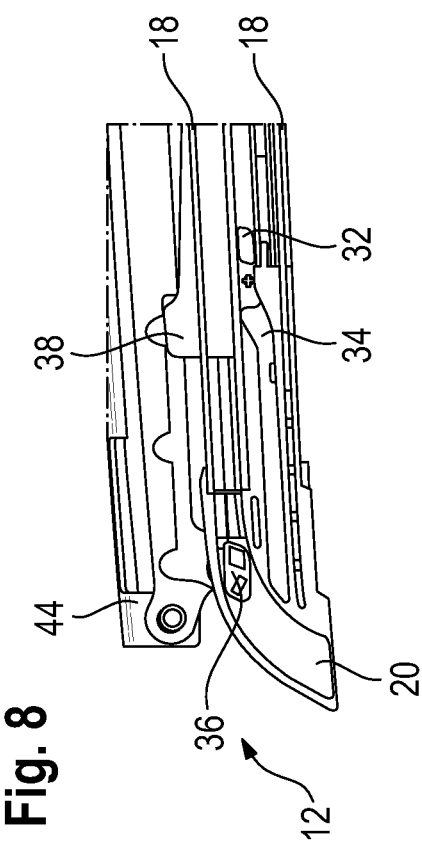
FIG. 8 a view corresponding to that of FIG. 6, wherein the cover is almost completely lifted.

If the controlling carriage 24, and thus the slotted guide component 22, is moved further backwards, then the sliding roof system 10 reaches the state where the cover-side lifting slider 36 passes from the diagonally upwardly rising section of the lifting slotted guide 20 into the horizontal part of the lifting slotted guide 20 (see the state shown in FIGS. 8 and 9). This state is achieved by displacing the slotted guide component 22 further backwards, with the result that the controlling slider 42 is displaced from the lower, almost flat part of the controlling slotted guide 30 into the steeply upwardly rising part at the front. As the alignment of the steeply upwardly rising part of the controlling slotted guide 30 is transverse to the displacement direction of the slotted guide component 22, the controlling slider 42 is now entrained backwards, with the result that it entrains the cover and thus also the lifting slider 36 backwards. The lifting slider 36 is thereby guided towards the transition to the horizontal part of the lifting slotted guide 20.

During this displacement of the slotted guide component 22 backwards, the slotted guide slider 32 inside the displacement slotted guide 34 is moved upwards, whereby the slotted guide component 22 is pivoted about the axis connecting the slotted guide component 22 to the controlling carriage 24. This results in the front end of the slotted guide component 22 being located above the guide rail 18 (see FIG. 9).

Figure 10:
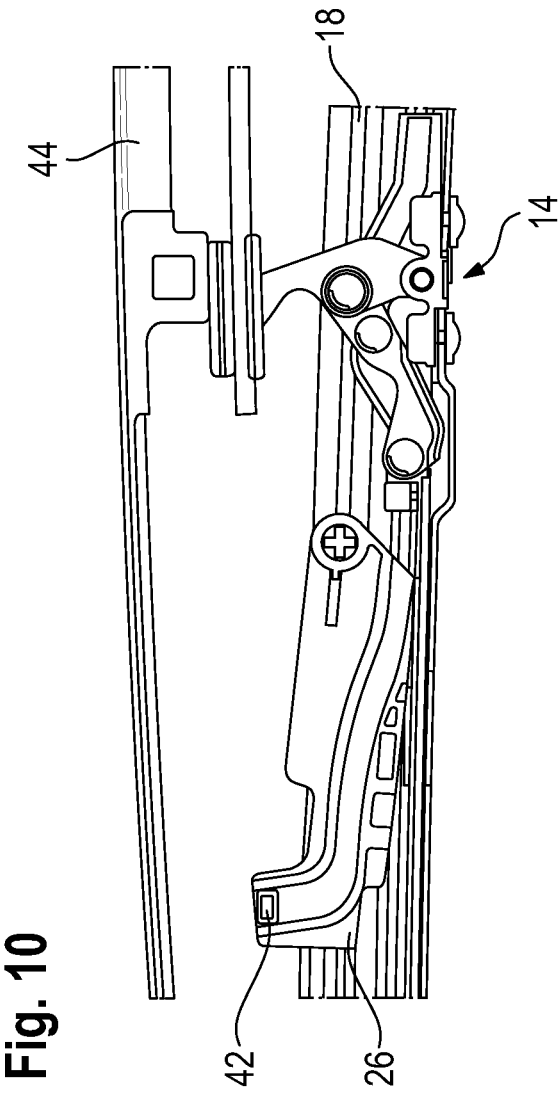
FIG. 10 a longitudinal section through the rear lifting mechanism, wherein the cover is in a maximally opened position.

When the controlling carriage 24 is moved further backwards, the cover 44 is entrained backwards by the controlling slider 42 which is located in the almost vertical section of the controlling slotted guide 30, with the result that it is pushed over the roof panel of the motor vehicle. At the same time, the cover-side lifting slider 36 inside the guide rail 18 is moved backwards. The complete open position of the sliding roof system 10 is reached when the slotted guide component 22 is moved to the rear lifting mechanism 14, as shown in FIG. 10.

The connection between the front lifting mechanism 12 and the rear lifting mechanism 14 is described below.

During this lifting movement of the sliding roof system 10, the front lifting mechanism 12 cooperates with the rear lifting mechanism 14 via a connecting element 16.

In the embodiment represented, the connecting element 16 is implemented in the form of a connecting plate 46, as shown in FIG. 11. The connecting plate 46 has, at its front end, an actuation protrusion 48 on one flat side and a catch protrusion 50 on the opposite flat side.

The catch protrusion 50 here is attached closer to the rear lifting mechanism than the actuation protrusion 48.

Figure 14:
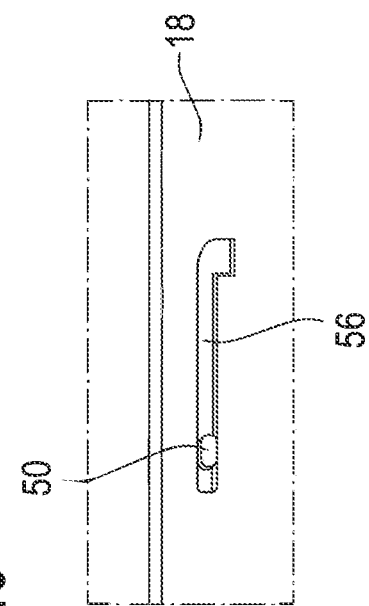
FIG. 14, in a perspective view, the coupling of the connecting plate to the rear lifting mechanism.

At its rear end, the connecting plate 46 has a stop 52 which is pivotably coupled to the rear lifting mechanism 14, as shown in FIG. 14. Here, a slide bearing is formed by the configuration of the surfaces cooperating with each other.

Figure 15:
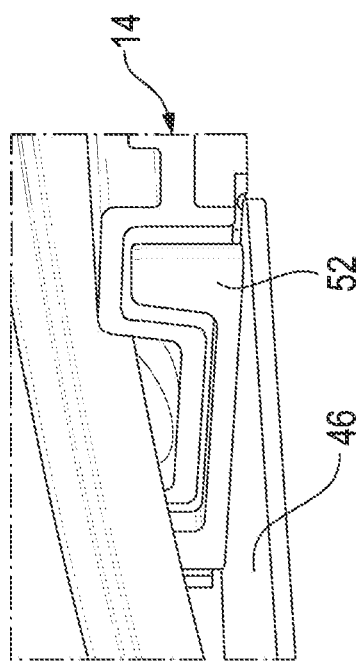
FIG. 15, in a perspective view, the coupling of the connecting plate to the front lifting mechanism.
Figure 18:
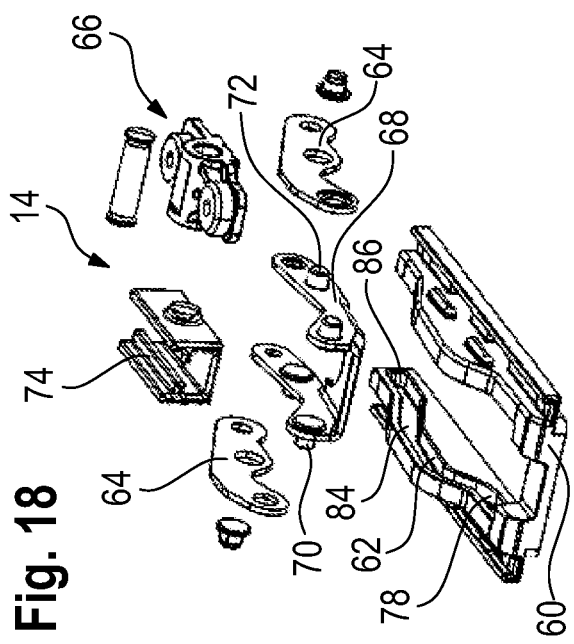
FIG. 18 an exploded view of the rear lifting mechanism from FIG. 17.

The actuation protrusion 48 is assigned to the front lifting mechanism 12. As is to be seen in FIG. 15, the actuation protrusion 48 in the closed position of the sliding roof system 10 engages in a connecting slotted guide 54 of the slotted guide component 22, in which the actuation protrusion 48 is moveably mounted.

The catch protrusion 50 of the connecting plate 46 is moveably arranged inside a catch slotted guide 56. The catch slotted guide 56 can be implemented for example in the guide rail 18 or a base plate 58. The catch slotted guide 56 has a front section running straight and a section running transverse to the plane of extension of the connecting plate 46. The transversely running section of the catch slotted guide 56 is designed working in the opposite direction to the transversely running section of the connecting slotted guide 54.

The connecting slotted guide 54 is aligned diagonally such that, when the slotted guide component 22 is displaced backwards (thus towards the rear lifting mechanism 14), it impinges on the actuation protrusion 48 laterally in the direction in which the short section running transverse to the displacement direction is located on the catch slotted guide 56. Accordingly, the connecting slotted guide 54 impinges on the actuation protrusion 48 when the slotted guide component 26 is displaced forwards, from the short section of the catch slotted guide 56 into the longer section extending in the longitudinal direction.

Figure 16:
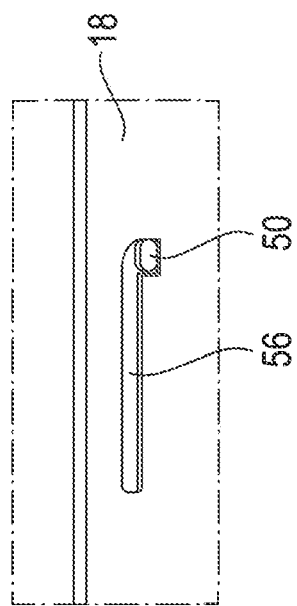
FIG. 16 the location of a catch protrusion of the connecting plate in a catch slotted guide of a sliding roof system according to the invention in an actuation position and a catch position.

When the sliding roof system 10 is moved from the closed position into the vent position, the connecting plate 46 is displaced backwards by the slotted guide component 26 along its direction of extension. As long as the catch protrusion 50 is located in the longer section of the catch slotted guide 56 (see FIG. 16), the connecting plate cannot give way laterally, with the result that it is pushed straight backwards and actuates the rear lifting mechanism 14, as will be explained later.

As soon as the catch protrusion 50 has reached the short, transversely running section of the catch slotted guide 56 (see FIG. 16), the connecting plate 46 is displaced laterally under the action of the lateral force component which is generated as a result of the diagonal alignment of the connecting slotted guide 54, with the result that the catch protrusion is set aside in the short, transversely running section of the catch slotted guide 56. When the catch position of the connecting plate 46 is reached, the rear lifting mechanism 14 is completely lifted.

When the slotted guide component 22 is moved further, it no longer cooperates with the connecting plate 46. The front lifting mechanism 12 is decoupled from the connecting plate 46 by the pivoting movement of the slotted guide component 22 during opening of the sliding roof system.

Underneath the connecting plate 46, a leaf spring 59 is guided inside the guide rail 18 or the base plate 58. In the closed position of the front lifting mechanism 12 this leaf spring is held under tension by the connecting plate 46. When the catch position is reached, the connecting plate 46 no longer covers the leaf spring 59. However, the slotted guide component presses on the leaf spring by means of a protrusion and holds it initially under tension. The leaf spring 59 is, however, released by the pivoting movement of the slotted guide component 22, whereby it laterally blocks the connecting plate 46. In this way, an uncontrolled lateral slipping of the connecting plate 46, for example due to vibrations or transverse loads, is prevented.

The rear lifting mechanism 14 is described below.

An embodiment of the rear lifting mechanism 14 is shown in FIGS. 17 to 22. The rear lifting mechanism 14 comprises a lifting carriage 60 with two opposite lifting slotted guides 62, two lifting levers 64, a fixed bearing 66, a translating lever 68, two first sliders 70, two second sliders 72 as well as a guide element 74.

In the embodiment shown, the translating lever 68 is implemented in one piece. However, it is also conceivable for it to be two individual translating levers 68 which are each assigned to one side of the controlling carriage 60.

The translating lever 68 is moveably coupled to the lifting carriage 60 by means of the first sliders 70 and the second sliders 72. The translating lever 68 is moreover pivotably connected to the lifting levers 64, wherein the connection is positioned on the lifting lever 64 between its ends. The lifting lever 64 is pivotably attached at one end to a fixed bearing 66 and connected at its other end to a guide element 74. The translating lever 68 lies closer to the front lifting mechanism 12 than the fixed bearing 66.

The lifting slotted guides 62 have a low-level section 78, a diagonally upwardly extending section 80, a high-level section 82, a diagonally downwardly extending section 84 and a second low-level section 86.

It is also conceivable for the two low-level sections 78 and 86 not to lie at the same level.

In the embodiment shown, the lifting carriage 60 accommodates the translating lever 68, the lifting levers 64, the fixed bearing 66 as well as the guide element 74 between the side parts of the lifting carriage 60 lying opposite each other. This arrangement ensures a particularly stable construction.

Figure 20:
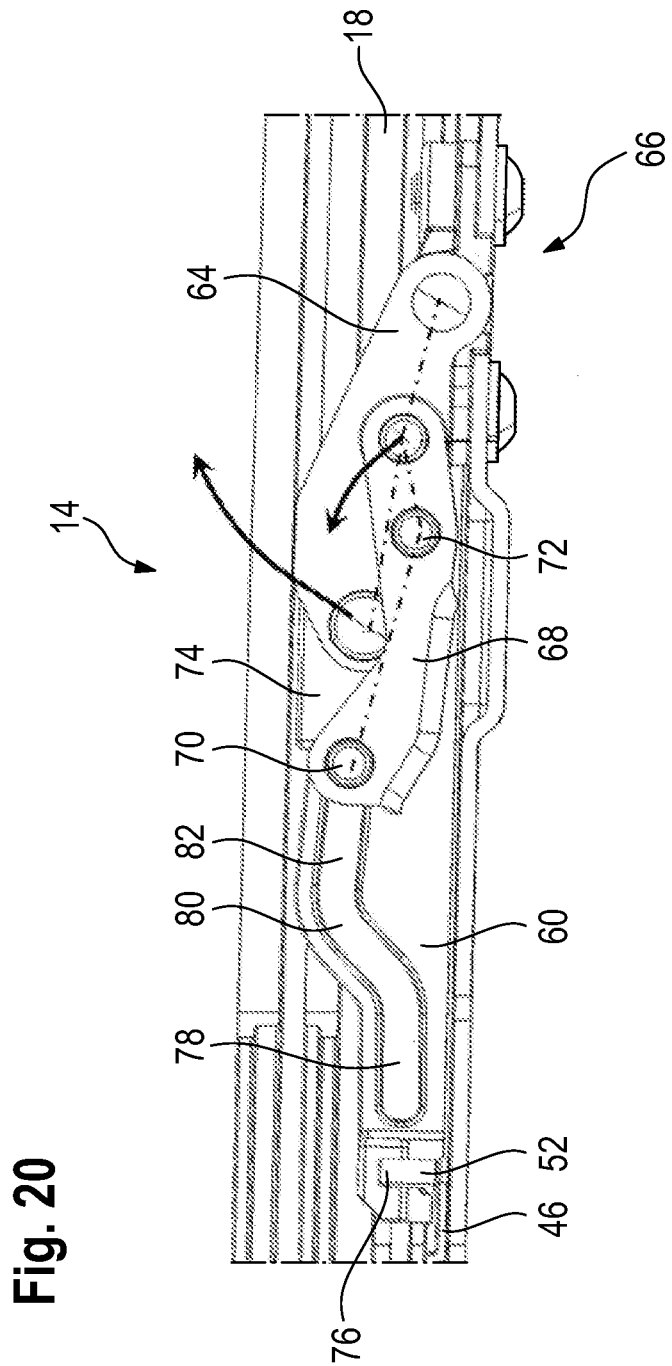
FIG. 20 a longitudinal section through the rear lifting mechanism in the closed position.

The connecting element 16, designed as a connecting plate 46 in the embodiment shown, engages in a recess 76 of the lifting carriage 60 by means of the stop 52, as represented in FIGS. 14 and 20. The connecting plate 46 is thereby pivotably coupled to the rear lifting mechanism 14. This makes it possible to displace the connecting plate 46 transverse to its direction of extension during the transition from the actuation position to the catch position, while at the same time a connection between connecting plate 46 and rear lifting mechanism 14 remains guaranteed.

In principle, other designs of the stop 52 are also conceivable, for example by means of a single pin or a ball head.

Figure 17:
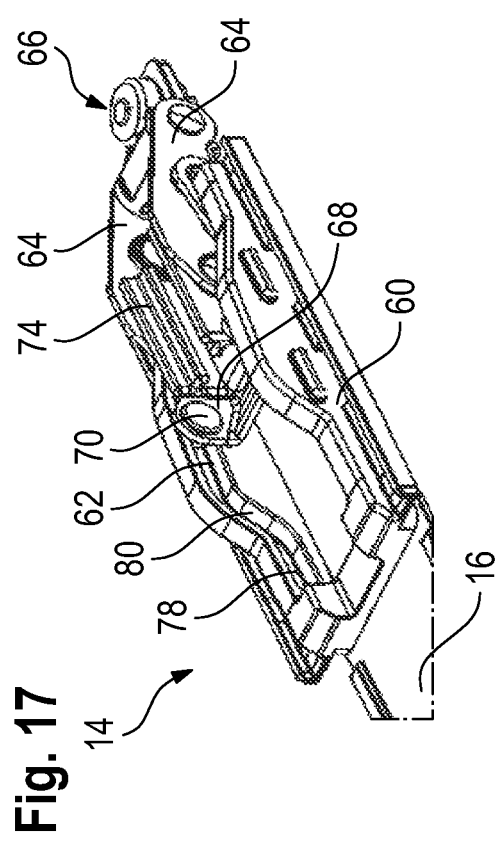
FIG. 17 a perspective view of the rear lifting mechanism in a closed position.
Figure 19:
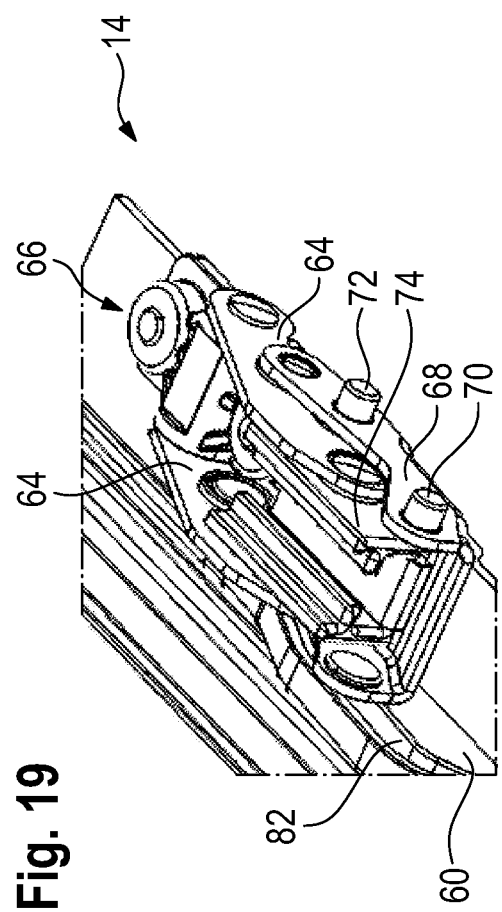
FIG. 19 a further perspective view of the rear lifting mechanism of the closed position.

FIGS. 17, 19 and 20 show the rear lifting mechanism 14 in the closed position of the sliding roof system 10. The first sliders 70 are located in the high-level section 82 of the lifting slotted guide 62 and the second sliders 72 are located in the second low-level section 86 of the lifting slotted guide 62. The elements of the rear lifting mechanism 14 accommodated between the side parts of the lifting carriage 60 are arranged in the closed position such that they do not protrude substantially in terms of their height beyond the lifting carriage 60.

If the slotted guide component 22 of the front lifting mechanism 12 is moved by the controlling carriage 24, the connecting plate 46 is moved backwards. The stop of the connecting plate 46 acts on the lifting carriage 60 which is thereby likewise moved backwards. In the process the lifting carriage 60 can at least partially travel over the fixed bearing 66.

Through the movement of the lifting carriage 60, the first sliders 70 and the second sliders 72 are moved inside the lifting slotted guide 62. The longitudinal movement of the lifting carriage 60 is translated into a setting-up of the lifting levers 64 by means of the translating lever 68.

Firstly, half of the lifting movement is realized by moving the first slider 70 inside the high-level section 82 and the second slider 72 inside the diagonally downwardly extending section 84. Then the second half of the lifting movement is generated by moving the first slider 70 inside the diagonally upwardly extending section 80 and the second slider 72 inside the high-level section 82.

The translating lever 68 is moved by the movement of the first sliders 70 and the second sliders 72. The translating lever 68 there acts on the lifting levers 64 which are then set up. The lifting levers 64 rotate about their ends, with which they are fastened to the fixed bearing 66.

The extent of the lifting movement of the rear lifting mechanism 14 is defined firstly by the height difference between the high-level section 82 and the low-level sections 78 and 86 and secondly by the length of the lifting lever 64 and the point at which the translating lever 68 is connected to the lifting lever 64. Because, in the embodiment shown, the translating lever is connected to the lifting lever 64 approximately centrally between the two ends thereof, a lifting height is reached which corresponds to more than twice the height difference between the high-level section 82 and the low-level sections 78 and 86.

At the same time, the guide element 74 is lifted by the setting-up movement of the lifting levers 64. The cover holder 88 connected to the cover 44 is displaceably guided in the guide element 74, whereby the cover 44 is lifted by the setting-up movement of the lifting lever 64.

Figure 22:
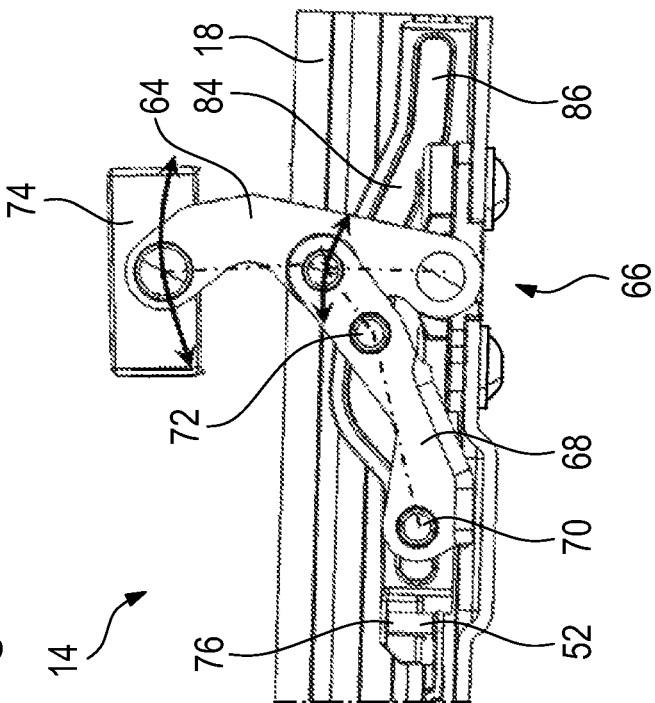
FIG. 22 a side view of the rear lifting mechanism in an opened position.
Figure 21:
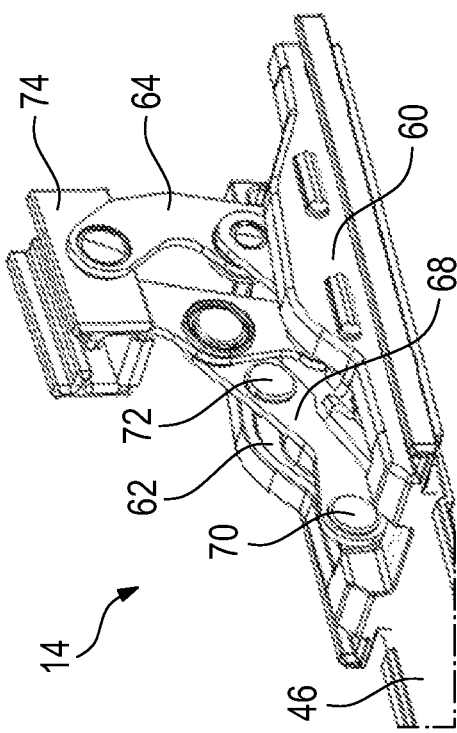
FIG. 21 a perspective view of the rear lifting mechanism in an opened position.

As soon as the first slider 70 reaches the front end of the low-level section 78, the connecting plate 46 passes from the actuation position into the catch position, with the result that the connecting plate 46 does not move the lifting carriage 60 further backwards. This corresponds to the vent position of the sliding roof system 10. Thus, the rear lifting mechanism 14 is already completely lifted in the vent position, as shown in FIGS. 21 and 22.

If the slotted guide component 22 of the front lifting mechanism 12 is moved further backwards after the vent position has been reached, only the cover 44 is displaced backwards. In the process, the cover support 88 connected to the cover 44 is displaced backwards in the guide element 74.

In an alternative embodiment, the lifting carriage 60 comprises only one lifting slotted guide 62 which is formed as an open recess in the lifting carriage 60. In this embodiment, a first slider 70 and a second slider 72 pierce the lifting slotted guide 62. The lifting carriage 60 comprises two translating levers 68 which are connected to the lifting slotted guide 62 via the first slider 70 and the second slider 72.

The invention claimed is:

1. A sliding roof system for a motor vehicle, with a front lifting mechanism and a rear lifting mechanism which are assigned to a front and a rear edge respectively of a cover of the sliding roof system, as well as a connecting element which is arranged between the front and the rear lifting mechanisms,
    wherein the connecting element is formed as a connecting plate which is displaceable transverse to its direction of extension and in its plane of extension between an actuation position and a catch position,
    wherein the connecting plate has a catch protrusion on one flat side, a biasing mechanism for displacing the connecting plate transverse to its direction of extension during a transition from the actuation position to the catch position, and an actuation protrusion on an opposite flat side which is assigned to the front lifting mechanism,
    wherein the connecting plate has a stop with which it is pivotably coupled to the rear lifting mechanism by engaging in a recess of the rear lifting mechanism.

2. The sliding roof system of claim 1 wherein the actuation protrusion of the connecting plate in the actuation position moveably engages in a connecting slotted guide of the front lifting mechanism.

3. The sliding roof system of claim 2 wherein the catch protrusion of the connecting plate is biased by a catch slotted guide.

4. The sliding roof system of claim 3 wherein the catch protrusion in the catch position of the connecting plate lies in a transversely running section of the catch slotted guide.

\* \* \* \* \*